United States Patent
Murray et al.

(10) Patent No.: US 8,114,943 B2
(45) Date of Patent: *Feb. 14, 2012

(54) PROCESS FOR BROMINATING BUTADIENE/VINYL AROMATIC COPOLYMERS

(75) Inventors: Daniel J. Murray, Midland, MI (US); David B. Gorman, Midland, MI (US); John W. Hull, Jr., Midland, MI (US); William J. Kruper, Jr., Sanford, MI (US); Ted A. Morgan, Midland, MI (US); Bruce A. King, Midland, MI (US); Ronald B. Leng, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 256 days.

This patent is subject to a terminal disclaimer.

(21) Appl. No.: 12/375,656

(22) PCT Filed: Aug. 14, 2007

(86) PCT No.: PCT/US2007/018111
§ 371 (c)(1), (2), (4) Date: Jan. 29, 2009

(87) PCT Pub. No.: WO2008/021418
PCT Pub. Date: Feb. 21, 2008

(65) Prior Publication Data
US 2009/0292079 A1    Nov. 26, 2009

Related U.S. Application Data

(60) Provisional application No. 60/838,086, filed on Aug. 16, 2006, provisional application No. 60/902,317, filed on Feb. 20, 2007.

(51) Int. Cl.
*C08C 19/14* (2006.01)
*C08F 8/22* (2006.01)
(52) U.S. Cl. .................. 525/332.3; 525/332.9; 525/355; 525/356; 525/357; 525/384
(58) Field of Classification Search ............... 525/332.3, 525/332.9, 356, 357
See application file for complete search history.

(56) References Cited

U.S. PATENT DOCUMENTS

| | | | |
|---|---|---|---|
| 5,677,390 A | 10/1997 | Dadgar | |
| 5,686,358 A | 11/1997 | Choi | |
| 5,767,203 A | 6/1998 | Ao | |
| 6,232,393 B1 | 5/2001 | Dadger | |
| 6,232,408 B1 | 5/2001 | Dadger | |
| 6,235,831 B1 | 5/2001 | Reed | |
| 6,235,844 B1 | 5/2001 | Dadgar | |
| 7,674,862 B2 * | 3/2010 | Gorman | 525/355 |
| 7,851,558 B2 * | 12/2010 | King et al. | 525/331.9 |
| 2008/0287559 A1 * | 11/2008 | King et al. | 521/56 |

FOREIGN PATENT DOCUMENTS

| | | |
|---|---|---|
| DE | 137308 A | 8/1979 |
| EP | 359269 A | 3/1990 |
| GB | 383154 A | 11/1932 |
| WO | 99/55770 A | 11/1999 |

OTHER PUBLICATIONS

Buckles et al, "Spectrophotometric Study of Tetrabutylammonium Tribromide", Oct. 1951.
Conte et al., Mimicking the vanadium Bromoperoxidases Reactions . . , Tetrahedron Letters 35, 7429-7432 (1994).
Avramoff et al., "The Brominating Properties of Tetrametylammonium Tribromide", 1963.
Collado et al., "Nucleophilic 1,2 Addition of Bromine to Electron deficient double bonds by perbromide reagents", Tetrahedron 50, 6433-6440 (1994).
Muathen, "1,8 diazabicyclo[5.4.0]undec-7-ene hydrobromide perbromide . . . ", J. Org. Chem. 1992, 57, 2740-2741.
Bora et al., "Regioselctive Bromination of Organic Substrates . . . ", Org. Letters. 2000, 2, 247-249.
Buzdugan et al., "Bromination of Some Styrene-Diene Block Copolymers", Eur. Polym. J. 33, 1713-1716 (1997).

* cited by examiner

*Primary Examiner* — Roberto Rabago
(74) *Attorney, Agent, or Firm* — Gary C Cohn PLLC

(57) ABSTRACT

Butadiene copolymers are brominated in solution using bromine as the brominating agent. The bromination is conducted in the presence of an excess of an aliphatic alcohol, relative to the amount of bromine that is used. The bromination proceeds rapidly at mild conditions, and is selective in that only aliphatic carbon-carbon double bonds are brominated, and unwanted bromination at tertiary carbon atoms is largely or completely avoided. The resulting brominated polymers are characterized in having very good thermal stability.

12 Claims, No Drawings

US 8,114,943 B2

PROCESS FOR BROMINATING BUTADIENE/VINYL AROMATIC COPOLYMERS

This application claims benefit of U.S. Provisional Application Nos. 60/838,086, filed 16 Aug. 2006, and 60/902,317, filed 20 Feb. 2007.

The present invention relates to a process for brominating a butadiene copolymer, such as a brominated block, random or graft copolymer of styrene and butadiene.

Brominated compounds such as hexabromocyclododecane are commonly used as flame retardant (FR) additives for various polymer systems. FR additives increase the limiting oxygen index (LOI) of polymer systems, allowing articles made from those polymer systems to pass standard fire tests. Because hexabromocyclododecane is under regulatory and public pressure that may lead to restrictions on its use, there is an incentive to find a replacement. One candidate for replacing hexabromocyclododecane is a brominated polybutadiene polymer or copolymer.

A practical FR additive must possess sufficient thermal stability to undergo very little, if any, thermal degradation when subjected to melt processing conditions, during which the FR additive may be exposed to temperatures as high as 230 to 250° C. or higher. FR additives must possess other key characteristics as well, including compatibility with other polymers and other additives (notably foaming agents). In polymer foam applications, the FR additive should not have a significant adverse effect on the foaming process or on the produced foam, particularly on foam cell formation and foam cell size.

Brominated polybutadiene polymers and copolymers are known materials. The stability of these polymers at high temperatures tends to be inadequate for them to be used as FR additives in polymer systems. Often, significant degradation is seen when the brominated polybutadiene polymers are exposed to temperatures of 200° C. or even lower. Temperature stability to 230° C., more preferably 240° C., and even more preferably to 250° C. or higher, is desired.

One method for brominating a polybutadiene homopolymer is described in French patent FR 1506872. Bromination is performed using elemental bromine with carbon tetrachloride and butyl alcohol as a solvent mixture. German patent DD 137308 describes the bromination of a "low viscosity" (3000 to 4000 centipoise) polybutadiene homopolymer using elemental bromine with carbon tetrachloride and methanol or ethanol as a reaction mixture.

Other processes have been used to brominate alkenes, dienes or polybutadiene. G. Dall' Asata et al., in *Die Makromolekulare Chemie*, 154, 279-290 (1972), describes using methylene chloride as a solvent, to avoid undesirable free radical reactions. H. Kawaguchi et al., in *Polymer*, 26, 1257-1264 (1985), describes bromination of a high cis-1,4-polybutadiene using dilute 1,2-dibromoethane in a mixture of methylene chloride and tetrahydrofuran (THF), at 0° C. and in the absence of oxygen. Ceausescu et al., in *J. Macromolecular Science-Chemistry*, A22 (5-7), 803-818 (1985), observed that brominated polybutadiene prepared with elemental bromine has poor thermal stability, and appears to release bromine and turn pink or brown even at room temperature. Ceausescu's observations refer to brominations of polybutadiene polymers having both low (5%) and high (60%) 1,2-isomer content. Ammonium tribromides, such as pyridinium tribromide, phenyltrimethylammonium tribromide, tetramethylammonium bromide, cetyltrimethylammonium tribromide and 1,8-diazabicyclo[5,4,0]-tetrabutylammonium tribromide, are also known brominating agents. See, e.g., *Advanced Organic Chemistry* (March, $2^{nd}$ Edition, 1977), p. 741, *Journal of Organic Chemistry*, 28, 3256 (1963), *Chem. Letters*, page 627 (1987); Tetrahedron, 50, page 6433 (1994), *Journal of the American Chemical Society* (JACS), 73, page 4525 (1951) and *Journal of Organic Chemistry*, 57, page 2740 (1992). *Tet Letters*, 35, 7429-7432 (1994) reports a mild and selective bromination in a two-phase system involving an aqueous phase and an organic substrate. The aqueous phase contains hydrogen peroxide, catalytic amounts of ammonium metavanadate ($NH_4VO_3$), and potassium bromide.

Bromination methods that use elemental bromine potentially offer several advantages. These mainly have to do with the lack of by-products that are formed in other processes. Ammonium tribromides, for example, form salt by-products that have to be separated from the product and represent a disposal problem. Brominating agents such as 1,2-dibromoethane also form by-products that have to be removed and disposed of. In principal, elemental bromine will not create such by-products, and so product work-up and disposal problems can be simplified.

It is therefore desirable to provide a process in which a highly thermally stable copolymer of butadiene can be brominated using elemental bromine as a brominating agent.

The present invention is in one aspect a process of preparing a brominated butadiene copolymer, the process comprising (a) contacting a solution of a starting copolymer of butadiene and at least one vinyl aromatic monomer in a solvent with elemental bromine in an amount of from 0.5 to 1.5 equivalents per equivalent of aliphatic carbon-carbon double bonds in the starting copolymer, said contact being in the presence of at least 0.5 mole of an aliphatic alcohol per mole of bromine; and (b) maintaining the reaction solution under reaction conditions for a period of time sufficient to brominate more than 25 percent or more than 50 percent of aliphatic double bonds contained in the starting copolymer.

The bromination process of the invention offers facile and rapid bromination under mild conditions, excellent selectively towards bromination of aliphatic carbon-carbon double bonds with little or no bromination of aromatic rings in the polymer, and good bromination of 1,2-butadiene units in the polymer. In addition, the brominated polymers tend to exhibit excellent thermal stability, as indicated by a thermal gravimetric analysis (TGA) method described below. Brominated polymers made in accordance with the invention often exhibit 5% weight loss temperatures, determined according to the TGA method described below, of above 200° C., more typically above 230° C. and in some cases above 240° C. or even 250° C. or more. Few by-products are produced, so the brominated copolymer can be recovered and purified easily, and disposal of by-products is not a significant problem. Another advantage of the invention is that solvents such as halogenated alkanes, cyclic alkanes that contain no hydrogen atoms bonded to a tertiary carbon atom and halogenated aromatic compounds are usually suitable; the use of these solvents eliminates the formation of ether groups on the polymer, as sometimes occurs when oxygenated solvents are used. Surprisingly, little halogen exchange seems to occur between the solvent and the brominated polymer, except under certain cases when elevated temperatures above 80° C. are used.

In another aspect, this invention is a process of treating a brominated butadiene copolymer, the process comprising contacting the brominated butadiene with an alkali metal base. This treatment often results in an even greater increase in thermal stability. The alkali metal base is preferably an alkali metal alkoxide. The treated copolymer may then be washed, preferably with water or an aqueous acid solution, to remove decomposition and reaction products of the alkali metal base from the copolymer.

The butadiene/vinyl aromatic copolymer that is the starting material is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene), and/or are ring-substituted. Ring substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" refers to repeating units in the starting material that are formed when a vinyl aromatic monomer is polymerized. The starting copolymer contains from 5 to 90 percent by weight of polymerized vinyl aromatic monomer units.

The butadiene/vinyl aromatic copolymer contains at least 10% by weight of polymerized butadiene. Butadiene polymerizes to form two types of repeating units. One type, referred to herein as "1,2-butadiene units" takes the form

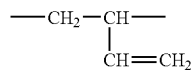

and so introduce pendant unsaturated groups to the polymer. The second type, referred to herein as "1,4-butadiene" units, takes the form —CH$_2$—CH=CH—CH$_2$—, introducing unsaturation into the main polymer chain. The butadiene/vinyl aromatic polymer contains at least some 1,2-butadiene units. Of the butadiene units in the butadiene/vinyl aromatic polymer, at least 10%, preferably at least 15% and more preferably at least 20% and even more preferably at least 25%, are 1,2-butadiene units. 1,2-butadiene units may constitute at least 50%, at least 55%, at least 60% or at least 70% of the butadiene units in the butadiene/vinyl aromatic copolymer. The proportion of 1,2-butadiene units may be in excess of 85% or even in excess of 90% of the butadiene units in the copolymer. For convenience, copolymers in which the 1,2-butadiene units constitute at least 50% of the total amount of butadiene units are sometimes referred to herein as "high 1,2-butadiene copolymers".

Methods for preparing butadiene/vinyl aromatic polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci*. A-2, 9, 43-57 (1971), J. Zymona, E. Santte and H. Harwood in *Macromolecules*. 6, 129-133 (1973), and H. Ashitaka, et al., *J. Polym. Sci. Polym. Chem.* 21, 1853-1860 (1983).

The butadiene/vinyl aromatic copolymer may be a random, block (including multiblock) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene/vinyl aromatic polymer may also contain repeating units formed by polymerizing monomers other than butadiene and the vinyl aromatic monomer. Such other monomers include olefins such as ethylene and propylene, acrylic or acrylate monomers such as methyl methacrylate, methyl acrylate, acrylic acid, and the like. These monomers may be randomly polymerized with the vinyl aromatic monomer and/or butadiene, or may be polymerized to form blocks, or may be grafted onto the butadiene/vinyl aromatic copolymer.

The butadiene/vinyl aromatic copolymer has a weight average molecular weight ($M_w$) within a range of from 1,000 to 400,000, preferably from 2,000 to 100,000, more preferably from 5,000 to 100,000 and even more preferably, at least from a commercial availability point of view, from 50,000 to 175,000. For purposes of this invention, molecular weights are apparent molecular weights as measured by gel permeation chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector (or equivalent device), with tetrahydrofuran (THF) flowing at a rate of 1 ml/min and heated to a temperature of 35° C. as the eluent.

The most preferred type of butadiene/vinyl aromatic copolymer is a block copolymer containing one or more polystyrene blocks and one or more polybutadiene blocks. Among these, block copolymers having a central polybutadiene block and terminal polystyrene blocks are especially preferred.

The bromination reaction is conducted in the presence of a solvent for the butadiene/vinyl aromatic copolymer. Suitable solvents include ethers such as tetrahydrofuran; halogenated alkanes such as carbon tetrachloride, chloroform, dichloromethane, bromochloromethane and 1,2-dichloroethane; hydrocarbons such as cyclohexane, cyclopentane, cyclooctane and toluene, and halogenated aromatic compounds such as bromobenzene, chlorobenzene and dichlorobenzene. Preferred solvents have boiling temperatures (at atmospheric pressure) of less than 100° C. (especially less than 80° C.), are substantially immiscible in water, are aprotic, and do not contain either hydrogen atoms bonded to a tertiary carbon atom or oxygen. Especially preferred solvents are more volatile than water, and are thus easily removed from water. Halogenated alkanes, cyclic alkanes that contain no hydrogen atoms bonded to a tertiary carbon atom and halogenated aromatic compounds are particularly preferred solvents. Two especially preferred solvents are dichloroethane and cyclohexane.

Elemental bromine is used as the brominating agent. The amount of elemental bromine that is used may be as much as 1.5 moles per mole of aliphatic carbon-carbon double bonds contained in the starting polymer. A suitable amount of bromine is from 0.5 to 1.2 moles/mole of aliphatic carbon-carbon double bonds. A preferred amount is from 0.8 to 1.1 moles/mole and a more preferred amount is from 0.95 to 1.05 moles/mole. The ability to obtain good results using more than 1 mole of bromine/mole of aliphatic carbon-carbon double bonds is particularly noteworthy.

The reaction is conducted by mixing the elemental bromine with a solution of the butadiene/vinyl aromatic copolymer in the presence of an aliphatic alcohol, and allowing the mixture to react until the desired proportion of butadiene units have been brominated. The amount of aliphatic alcohol is selected such that (1) at least 0.5 mole of the alcohol is provided per mole of elemental bromine and (2) the starting butadiene/vinyl aromatic copolymer remains soluble in the reaction mixture. Some aliphatic alcohols act as antisolvents for the starting copolymer, and so their presence in excessive amounts can cause the starting copolymer to precipitate from solution. A preferred amount of the aliphatic alcohol is 0.5-6 moles/mole of elemental bromine, a more preferred amount is 0.75-3.5 moles/mole of elemental bromine, and an even more preferred amount is 1.00-1.05 moles/mole of elemental bromine. Quantities above these amounts can be used provided that the starting copolymer remains soluble. Generally, there is little need to use more than one mole of the alcohol/mole of elemental bromine.

Suitable alcohols include methanol, ethanol, isopropanol, n-propanol, t-butanol, n-butanol, 2-butanol, isobutanol, n-pentanol, 2-pentanol, n-hexanol, n-octanol, cyclohexanol, 1,2-hexanediol, glycerine; sucrose, glucose, poly(vinylalcohol), polyethers having one or more hydroxyl groups (particularly homopolymers or copolymer of propylene oxide or butylene oxide, which have a secondary hydroxyl group), and the like. Preferred alcohols have secondary or tertiary alcohol groups. Most preferred alcohols are those that have secondary alcohol groups. Some preferred alkanols have from 1 to 8 carbon atoms. An especially preferred alcohol is isopropanol.

The elemental bromine should be added to the starting copolymer while the starting copolymer is dissolved in the solvent and in the presence of the alcohol.

The solvent is used in quantities sufficient to dissolve the butadiene/vinyl aromatic copolymer under the conditions of the reaction. The concentration of the copolymer in the solvent may range from, for example, 1 to 50% by weight, especially from 5 to 35% by weight. In some cases, the maximum concentration of the copolymer in the solvent may be limited by the solubility of the starting copolymer under the conditions of the reaction.

Generally, only mild conditions are needed to effect the bromination. Subambient temperatures as low as −80° C. can be used from the point of view of reaction kinetics, although it is difficult to keep the starting copolymer in solution at such low temperatures. Preferred bromination temperatures can range from −40 to 100° C., and are preferably from −20 to 85° C. and especially from −10 to 70° C. Temperatures higher than 100° C. could be used, but are not necessary and may lead to a loss of selectivity and/or an increase in by-products. Generally, an exotherm is seen at the beginning of the reaction, when the bromine is first contacted with the starting copolymer.

The time of the reaction is sufficient to achieve the desired amount of bromination. Typically, the reaction is continued until bromination has occurred on least 25% of the butadiene units in the copolymer. More preferably, at least 80% and more preferably at least 90% and even more preferably at least 95% of the butadiene units are brominated. Up to 100% of the butadiene units can be brominated. Preferably up to 99% or up to 95% of the butadiene units are brominated. The extent of bromination can be determined using proton NMR methods. Residual double bond percentage, polymerized styrene monomer content and 1,2-isomer content can be determined by comparing integrated areas of signals due to appropriate protons (residual double bond protons are between 4.8 and 6 ppm) (relative to tetramethylsilane (TMS)), styrene aromatic protons are between 6.2-7.6 ppm, and protons for brominated polybutadiene are between 3.0 and 4.8 ppm). A Varian INOVA™ 300 NMR spectrometer or equivalent device is useful for such determinations, being operated with a delay time of 10 seconds to maximize relaxation of protons for quantitative integrations. A deutero-substituted solvent such as deutero-chloroform or d5-pyridine is suitable for diluting the sample for NMR analysis.

Large quantities of residual double bonds in the brominated polymer can lead to undesirable cross-linking reactions, particularly when the brominated copolymer is blended with another polymer such as a polyvinyl aromatic polymer for use in melt-processing operations such as foam or film extrusion, fiber spinning, or injection molding. The crosslinking may lead to gel formation, and fouling of processing equipment. The presence of gels may lead to one or more of impaired physical properties, blemished surface or optical properties, or increased color formation. Gels may affect the ability to melt-process the blends, particularly when the blends are foamed.

When the desired amount of bromination has been achieved, the reaction can be stopped by the addition of a reducing agent such as an alkali metal bisulfite salt.

Depending on the particular solvent and the particular copolymer, the copolymer may become less soluble in the reaction mixture as the copolymer becomes brominated, and may precipitate from the reaction mixture.

Under the conditions described above, the bromination reaction tends to be highly selective, in several respects. Little or no bromination occurs on the aromatic rings. Otherwise, bromination tends to take place at the carbon-carbon double bonds of both 1,2- and 1,4-butadiene units, and bromination tends to take place so that little bromination occurs at tertiary carbon atoms. It is believed that the bromination occurs through an ionic mechanism, rather than a free radical mechanism which would tend to introduce unwanted bromines at tertiary carbon atoms. These tertiary bromines are believed to adversely affect the temperature stability of the brominated copolymer.

In cases in which the brominated polymer is insoluble in the reaction mixture, the product can be recovered using any convenient solid/liquid separation method such as filtration, decantation or the like. If the brominated polymer remains soluble in the reaction mixture, it is conveniently isolated from the mixture through a suitable method such as distillation of the solvent either with or without water present, or addition of an anti-solvent which causes the brominated copolymer to become insoluble and precipitate.

Such an anti-solvent can be in some cases the same alcohol that is present during the bromination reaction. In such a case, more of the alcohol is added to the reaction mixture at the end of the bromination reaction, in order to precipitate the brominated polymer. The precipitated polymer then can be separated from the liquid phase using a convenient solid/liquid separation method. The alcohol and solvent can then be separated to recover each of them for recycle back into the process. Preferably, the solvent and alcohol do not form an azeotropic mixture and can be separated by distillation methods.

The solution of brominated copolymer may be purified in various ways to remove byproducts and other unwanted materials. Water-soluble impurities can be removed by washing with water or a salt solution.

The isolated polymer may be purified to remove residual bromine, brominating agent, solvent and by-products as desired or needed for a particular application. Bromide salts may be removed by passing the dissolved polymer through silica gel or an ion exchange resin bed. The polymer may be washed with an aqueous sodium hydrogen sulfite solution to neutralize or quench unreacted brominating agent that may be present. This effectively removes or eliminates any orange color that may be present in the polymer due to residual bromine or bromine compounds. Alternatively, the polymer solution may be washed with water or a salt solution such as aqueous sodium bicarbonate to remove residual bromide species.

The production of a brominated polymer using this method may be carried out either in a batch reactor, whereby bromine is added in portions to a solution of the starting copolymer, or alternatively in a continuous reactor where the starting copolymer and bromine are fed simultaneously into a reactor and continuously removed and the brominated polymer isolated from the reactor effluent. In some instances, a continuous reactor may hold certain advantages over a batch reactor, such as being a more economical method of production of a brominated polymer in a commercial scale production unit. Examples of continuous reactors that could be used in the commercial production of a brominated polymer may include a continuously stirred tank reactor (CSTR), a tubular flow reactor, or a micro-reactor. A micro-reactor is a device fabricated out of certain materials and having micron-sized reaction channels suitable for the simultaneous injection of liquid feeds that allow efficient mixing and removal of the heat of reaction expected to be generated upon mixing of the starting polymer with bromine. Both the bromination and the precipitation steps may be carried out in a continuous fashion.

The process of the invention tends to produce brominated copolymer products that have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (ml/min) flow of gaseous nitrogen and a heating rate of 10° C./minute over a range of from room temperature (nominally 25° C.) to 600° C. The mass lost by the sample is monitored during the heating step, and the temperature at which the sample has lost 5% of its initial weight is designated the 5% weight loss temperature (5% WLT). The brominated copolymer preferably exhibits a 5% WLT of at least 200° C. The 5% WLT is preferably at least 220° C., more preferably at least 230° C., even more preferably at least 240° C., and still more preferably at least 250° C. Brominated copolymers in which at least 85% of the butadiene units have been brominated, and which have such 5% WLT values, are of particular interest.

A further increase in thermal stability is sometimes seen if the brominated copolymer is treated with an alkali metal base. The alkali metal base may be, for example, a hydroxide or a carbonate. The alkali metal base is preferably an alkali metal alkoxide, as the alkali metal alkoxides tend to provide more of an increase in thermal stability than do some other bases, such as alkali metal hydroxides, carbonates or carboxylates. In some cases, an increase in 5% WLT of from 3 to 12° C. or more is seen when the brominated copolymer is treated with an alkali metal alkoxide. Increases in 5% WLT of from 1 to 6° C. are typically seen with treatment with alkali metal hydroxides, alkali metal carbonates and alkali metal carboxylates.

The alkali, metal can be lithium, sodium, potassium or cesium. Lithium, sodium and potassium are preferred.

The base is an alkali metal alkoxide in preferred embodiments. The alkoxide ion can contain from 1 to 8, preferably from 1 to 4, carbon atoms, with methoxide and ethoxide being especially preferred. Especially preferred alkali metal alkoxides are lithium methoxide, sodium methoxide, potassium methoxide, lithium ethoxide, sodium ethoxide and potassium ethoxide.

The brominated copolymer can be treated with as little as 0.01 mole of the alkali metal base, per mole of polymerized butadiene units in the copolymer (whether brominated or unbrominated). There is no upper limit on the amount of alkali metal base, although cost and handling considerations mitigate against using more than about 1 mole of the alkali metal base per mole of polymerized (brominated or unbrominated) butadiene units in the copolymer. A preferred amount is from 0.03 to 0.50 moles/mole of polymerized (brominated or unbrominated) butadiene units, and an especially preferred amount is from 0.05 to 0.20 moles/mole.

The alkali metal base can be added at various stages of the bromination and subsequent product recovery process. For example, the alkali metal base may be present during the bromination reaction, in this case being added prior to, simultaneously with or after the brominating agent is introduced to the starting copolymer. In this case, the alkali metal base (or its decomposition or reaction products) are carried along with the copolymer through at least the initial product recovery steps. The alkali metal base (or its decomposition or reaction products) may be removed during downstream recovery processes such as washing and precipitation from the solvent.

It is more preferred to introduce the alkali metal base after the bromination reaction is completed, while the brominated copolymer is in solution. In a preferred process, the brominated copolymer solution is first separated from the aqueous phase (if any) that is present and the copolymer solution is then contacted with the alkali metal base. The alkali metal base can be added in several ways. It can be added to the brominated copolymer as a finely divided solid, in which case the mixture should be agitated well to provide good contact of the alkali metal base with the copolymer solution.

The alkali metal base can be added a solution in an appropriate solvent, such as methanol, ethanol or 2-propanol, which preferably is miscible with the brominated copolymer solution. If the solvent for the alkali metal base is an antisolvent for the brominated copolymer, the treatment step can be combined with the precipitation of the copolymer from solution. The alkali metal base or a solution thereof can be added as a solution or a mixture in water, in which case, again, good mixing will be needed to ensure contact of the base with the brominated copolymer. It is noted that the preferred alkali metal hydroxides will hydrolyze in water to form a complex mixture of alkoxide, the corresponding alkali metal hydroxide, and an alcohol corresponding to the alkoxide ion. Thus, it is believed that in this case the brominated copolymer is in effect being treated with a mixture of the alkali metal alkoxide and the corresponding alkali metal hydroxide.

The copolymer may then be recovered from the solution by precipitation as described before, or other convenient method (if it is not precipitated simultaneously with the alkali metal base treatment). The treated copolymer may be washed one or more times before precipitating the copolymer, in order to remove decomposition and/or reaction products of the alkali metal base. One or more washes with water or dilute aqueous acid are suitable for this purpose. These washes can be done simultaneously with or following the alkali metal base treatment.

The temperature during the alkali metal base treatment can be, for example, from −10° C. to 100° C., and is preferably from about 10° C. to about 60° C. The alkali metal base needs only to be in contact with the copolymer for a short period of time, typically on the order of a few minutes or even less, to be effective.

It is also possible to treat the brominated copolymer after it has been recovered from a solvent used in the bromination step. In such a case, the alkali metal base can be added as a solution in a solvent that swells or dissolves the copolymer. Alternatively, the alkali metal base can be added (optionally as a solution) to a melt of the brominated copolymer. The treated brominated copolymer can then be washed as described before.

If desired, a material such as sodium gluconate or sodium sulfite may be added to the crude brominated copolymer solution prior to adding the alkali metal base. This is conveniently performed by adding the material as a solution in water or other solvent which is substantially immiscible with the solvent for the copolymer. This material may be removed from the brominated copolymer, preferably by separation of the immiscible phases, prior to adding the alkali metal base to the copolymer solution.

The brominated copolymer is useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated copolymer is soluble or can be dispersed to form domains of less than 10 micrometers (μm), preferably less than 5 μm, in size. Enough of the brominated copolymer is preferably present in the blend to provide the blend with a bromine content within a range of from 0.1 percent by weight to 25 percent by weight, based upon blend weight.

Blends of the brominated copolymer may include other additives such as flame retardant additives, flame retardant adjuvants, thermal stabilizers, ultraviolet light stabilizers, nucleating agents, antioxidants, foaming agents, acid scavengers and coloring agents.

The following examples are provided to illustrate the invention, but not to limit the scope thereof. All parts and percentages are by weight unless otherwise indicated.

EXAMPLE 1

6 grams of a poly(styrene-b-butadiene) copolymer (0.067 mole of polymerized polybutadiene units) and 60 mL carbon tetrachloride are added to a 250-mL 3-necked flask equipped with a mechanical stirrer and a thermocouple to prepare a stirred solution. After the stirred solution appears to be visually homogeneous, 22 mL of n-butanol is added with continued stirring. The resulting solution maintains a homogeneous appearance. 10.3 g (0.065 mole) of bromine is added to the room temperature, stirred solution over 20 minutes. The mole ratio of n-butanol to bromine is approximately 3.6:1. The reaction mixture evidences an exotherm during the bromine addition, reaching a maximum temperature of 41° C. The reaction mixture is stirred for an additional 15 hours, and 50 mL of a 20 wt % aqueous sodium bisulfite solution is then added. Stirring is then continued for 10 minutes more minutes before 50 mL of methylene chloride is added. The reaction mixture is transferred to a separatory funnel where it separates into an organic phase and an aqueous phase.

The organic phase is washed first with 50 mL of distilled water and then with 50 mL of saturated sodium chloride solution. The brominated polymer is precipitated from the washed organic phase by adding the washed organic phase into a 5-fold excess (based on solution volume) of methanol. The precipitated polymer is filtered and dried overnight in-vacuo at 80° C. to yield 13.7 g (84% isolated yield) of brominated polymer. Proton NMR of the brominated polymer shows 2.3% unreacted double bonds and TGA analysis shows a 5% weight loss temperature of 239° C.

EXAMPLE 2

To a 250-mL round bottom flask equipped with a thermowell, overhead stirrer with a stir paddle, addition funnel, and nitrogen inlet are added a poly(styrene/butadiene) tri-block co-polymer containing 60% polybutadiene (6.0 g, 0.067 mol polybutadiene equivalent), dichloromethane (60 g), and n-butanol (0.286 mol). The mole ratio of n-butanol to bromine is about 4.3:1. After the polymer has dissolved, the solution is cooled to 1° C. in an ice bath. Bromine (10.6 g, 0.066 mol) is added dropwise via an addition funnel over 18 minutes, keeping the pot temperature at or below 7° C. 35 minutes after the bromine addition is complete, the ice bath is removed and the hazy orange solution is extracted with 20% aqueous sodium bisulfite (51 g), followed by water (50 g), and then by a saturated aqueous sodium chloride solution (59 g). A 1-L round bottom flask equipped with an overhead stirrer with a Teflon stir paddle, addition funnel, and nitrogen inlet is loaded with methanol (400 g). The post-washed polymer solution is added to the methanol. The slurry is filtered through a coarse glass-fritted funnel. The solids are dried (75° C./40 mm Hg (5.3 kPa)) to constant weight to give dry, brominated polymer (14.6 g, 88% of the calculated weight of 100% brominated material) that by proton NMR is estimated to contain 2% of unreacted double bonds. The 5% weight loss temperature for this product is 239.5° C.

EXAMPLE 3

Example 2 is repeated this time using only 6.5 g (0.088 mol) of n-butanol. The mole ratio of n-butanol to bromine is about 1.3:1. The product is estimated by proton NMR to contain 2% of unreacted double bonds. The 5% weight loss temperature for this product is 223° C.

EXAMPLES 4 AND 5 AND COMPARATIVE SAMPLE A

Example 4 is prepared in the same manner as is Example 2, this time using only 4.0 g of n-butanol. The mole ratio of n-butanol to bromine is about 0.8. The product is estimated by proton NMR to contain<2% of unreacted double bonds. The 5% weight loss temperature for this product is 210° C.

Example 5 is prepared in the same manner, this time using only 2.5 g of n-butanol. The mole ratio of n-butanol to bromine is about 0.5:1. The product is estimated by proton NMR to contain<2% of unreacted double bonds. The 5% weight loss temperature for this product is 202° C.

Comparative Sample A is prepared in the same manner, this time using only 0.5 g of n-butanol. The mole ratio of n-butanol to bromine is about 0.1:1. The product is estimated by proton NMR to contain<2% of unreacted double bonds. The 5% weight loss temperature for this product is only 175° C.

EXAMPLE 6

To a 250-mL round bottom flask equipped with a thermowell, overhead stirrer with a stir paddle, addition funnel, and nitrogen inlet are added a poly(styrene/butadiene) tri-block co-polymer containing 60% polybutadiene (9.0 g, 0.1 mol polybutadiene equivalent), dichloromethane (127 g), and n-butanol (27.0 g, 0.365 moles). After the polymer has dissolved, the solution is cooled to 2° C. in an ice bath. Bromine (15.0 g, 0.094 mol) is added dropwise via an addition funnel over 14 minutes, keeping the pot temperature at or below 9° C. The funnel is rinsed with dichloromethane (3 g), adding the rinse to the pot. After 10 minutes after the bromine addition is complete, the ice bath is removed and the hazy orange solution is transferred to an addition funnel, using dichloromethane (20 g) to aid the transfer. The polymer solution is added via addition funnel to a heated 1-L round bottom flask loaded with water (602 g) at 65° C. and equipped with a short-path distillation apparatus, an overhead stirrer with a Teflon stir paddle, addition funnel, and nitrogen inlet. Distillate (140 mL) is collected in the overheads receiver. The remaining slurry is cooled to room temperature. The slurry is filtered through a coarse glass-fritted funnel, washing the solids with water (100 g). The solids are dried (75° C./20 mm Hg (2.7 kPa)) to constant weight to give dry, brominated polymer (22.5 g, 90% of the calculated weight of 100% brominated material) that by proton NMR is estimated to contain 4% of unreacted double bonds. The 5% weight loss temperature for this product is 239° C.

EXAMPLE 7

To a 1-L round bottom flask equipped with a thermowell, overhead stirrer with a stir paddle, addition funnel, and nitrogen inlet are added a poly(styrene/butadiene) tri-block co-polymer containing 60% polybutadiene (9.0 g, equivalent to 0.1 mol polybutadiene), dichloromethane (132 g), and methanol (12.7 g). After the polymer has dissolved, the solution is cooled to 1° C. in an ice bath. Bromine (15.8 g, 0.099 mol) is added dropwise via an addition funnel over 19 minutes, keeping the pot temperature at or below 5° C. The funnel is rinsed with dichloromethane (8 g), adding the rinse to the pot. After 6 minutes after the bromine addition is complete, the ice bath is removed and the hazy orange solution is transferred to an addition funnel, and diluted with dichloromethane (158 g). A 3-L round bottom flask equipped with an overhead stirrer with a Teflon stir paddle, addition funnel, and nitrogen inlet is loaded with methanol (735 g). The polymer solution is added via addition funnel to the methanol. The slurry is filtered through a coarse glass-fritted funnel, washing the solids with methanol (157 g). The solids are dried (65° C./20 mm Hg (2.7 kPa)) to constant weight to give dry, brominated polymer (22.3 g, 89% of the calculated weight of 100% brominated material) that by proton NMR is estimated to contain<2% of unreacted double bonds. The 5% weight loss temperature for this product is 237.5° C.

EXAMPLE 8

To a 1-L round bottom flask equipped with a thermowell, overhead stirrer with a stir paddle, addition funnel, and nitrogen inlet are added a poly(styrene/butadiene) tri-block co-polymer containing 60% polybutadiene (9.0 g, equivalent to 0.1 mol polybutadiene), dichloromethane (127 g), and 2-propanol (21.8 g). After the polymer has dissolved, the solution is cooled to 1° C. in an ice bath. Bromine (15.8 g, 0.099 mol) is added dropwise via an addition funnel over 9 minutes, keeping the pot temperature at or below 10° C. The funnel is rinsed with dichloromethane (17 g), adding the rinse to the pot. After 6 minutes after the bromine addition is complete, the ice bath is removed and the hazy orange solution is transferred to an addition funnel, and diluted with dichloromethane (153 g). A 3-L round bottom flask equipped with an overhead stirrer with a Teflon stir paddle, addition funnel, and nitrogen inlet is loaded with methanol (735 g). The polymer solution is added via addition funnel to the methanol. The slurry is filtered through a coarse glass-fritted funnel, washing the solids with methanol (157 g). The solids are dried (60° C./20 mm Hg (2.7 kPa)) to constant weight to give dry, brominated polymer (21.8 g, 87% of the calculated weight of 100% brominated material) that by proton NMR is estimated to contain 9% of unreacted double bonds. The 5% weight loss temperature for this product is 247° C.

EXAMPLE 9

To a 1-L round bottom flask equipped with a thermowell, overhead stirrer with a stir paddle, addition funnel, and nitrogen inlet are added a poly(styrene/butadiene) tri-block co-polymer containing 60% polybutadiene (9.0 g, equivalent to 0.1 mol polybutadiene), dichloromethane (128 g), and t-butanol (26.8 g). After the polymer has dissolved, the solution is cooled to 1° C. in an ice bath. Bromine (15.8 g, 0.099 mol) is added dropwise via an addition funnel over 14 minutes, keeping the pot temperature at or below 95° C. The funnel is rinsed with dichloromethane (11.9 g), adding the rinse to the pot. After 5 minutes after the bromine addition is complete, the ice bath is removed and the hazy orange solution is transferred to an addition funnel, and diluted with dichloromethane (148 g). A 3-L round bottom flask equipped with an overhead stirrer with a Teflon stir paddle, addition funnel, and nitrogen inlet is loaded with methanol (736 g). The polymer solution is added via addition funnel to the methanol. The slurry is filtered through a coarse glass-fritted funnel, washing the solids with methanol (159 g). The solids are dried (60° C./20 mm Hg (2.7 kPa)) to constant weight to give dry, brominated polymer (21.9 g, 88% of the calculated weight of 100% brominated material) that by proton NMR is estimated to contain<2% of unreacted double bonds. The 5% weight loss temperature for this product is 238° C.

EXAMPLE 10

To a 3-L round bottom flask equipped with a thermowell, overhead stirrer with a stir paddle, addition funnel, and nitrogen inlet are added a poly(styrene/butadiene) tri-block co-polymer containing 60% polybutadiene (90.0 g, equivalent to 1 mol polybutadiene), dichloromethane (1283 g), and 2-propanol (217.5 g). After the polymer has dissolved, the solution is cooled to 1° C. in an ice bath. Bromine (129.0 g, 0.8 mol) is added dropwise via an addition funnel over 8 minutes, keeping the pot temperature at or below 5° C. After the bromine addition is complete, the addition funnel is rinsed with dichloromethane (31 g), adding the rinse to the pot. The ice bath is removed and the hazy orange solution is diluted with dichloromethane (1282 g). After stirring the solution under ambient conditions for approximately 1.3 hours, the solution is divided into three portions (portion 1=1048 g, 820 mL; portion 2=1054 g, 820 mL; portion 3=905 g, 700 mL). For each portion, a 5-L round bottom flask equipped with an overhead stirrer with a 4.25" Teflon stir paddle, addition funnel, and nitrogen inlet is loaded with 2-propanol (portion 1=2515 g, 3204 mL; portion 2=2512 g, 3200 mL; portion 3=2298 g, 2927 mL). The polymer solutions are in each case added via addition funnel over 5-6 minutes to the 2-propanol. For the $3^{rd}$ portion, additional dichloromethane (59 g, 45 mL) is used to rinse out the original reaction vessel and the addition funnel, adding the rinse to the slurry. The individual slurries are filtered through a 600-mL capacity coarse glass-fritted funnel, washing each portion with 2-propanol (portion 1=508 g, 648 mL; portion 2=502 g, 639 mL; portion 3=475 g, 605 mL). The solids are air-dried to constant weight in drying trays under ambient conditions to give dry, brominated polymer (205.8 g, 82% of the calculated weight of 100% brominated material) that by proton NMR is estimated to contain 20% of unreacted double bonds. The 5% weight loss temperature for this product is 254° C.

EXAMPLE 11

To a 1-L round bottom flask equipped with a thermowell, overhead stirrer with Teflon stir paddle, addition funnel, and nitrogen inlet are added 9.0 g (equivalent to 0.1 mol of polybutadiene) of the poly(styrene/butadiene) tri-block co-polymer used in Example 2, cyclohexane (124 g), and 2-propanol (21.7 g). After the polymer has dissolved, the solution is cooled to 1° C. in an ice bath. Bromine (15.9 g, 5.1 mL, 0.099 mol) is added dropwise via an addition funnel over 6 minutes, keeping the pot temperature at or below 3° C. After the bromine addition is complete, the addition funnel is rinsed with cyclohexane (3.8 g), adding the rinse to the pot. The ice bath is removed and the hazy orange solution diluted with cyclohexane (29.2 g). After stirring the solution under ambient conditions for approximately 2 hours, 2-propanol (393 g, 500 mL) is added to the reaction mixture over 5 minutes. After stirring for 0.5 hours, the slurry is filtered through a coarse glass-fritted funnel, washing the cake with 2-propanol (155 g, 200 mL). The solids are transferred to a 1-L round bottom flask and are tumble dried using a rotary evaporator at 60° C./20 mm Hg (2.7 kPa) for 2 hours, giving dry, brominated polymer (20.3 g, 81% of the calculated weight of 100% brominated material) that by proton NMR is estimated to contain 23% of unreacted double bonds. The 5% weight loss temperature for this product is 252° C.

EXAMPLE 12

To a 1-L round bottom flask equipped with a thermowell, overhead stirrer with a stir paddle, addition funnel, and nitrogen inlet are added a poly(styrene/butadiene) tri-block co-polymer containing 60% polybutadiene (9.0 g, 0.1 mol polybutadiene equivalent), chlorobenzene (140 g), and 2-propanol (22.5 g). After the polymer has dissolved, the solution is cooled to 1° C. in an ice bath. Bromine (15.8 g, 0.099 mol) is added dropwise via an addition funnel over 11 minutes, keeping the pot temperature at or below 9° C. The funnel is rinsed with chlorobenzene (10 g), adding the rinse to the pot. After 6 minutes after the bromine addition is complete, the ice bath is removed and the hazy orange solution is transferred to an addition funnel, and diluted with chlorobenzene (97 g). A 3-L round bottom flask equipped with an overhead stirrer with a Teflon stir paddle, addition funnel, and nitrogen inlet is loaded with 2-propanol (752 g). The polymer solution is added via addition funnel to the 2-propanol. The slurry is filtered through a coarse glass-fritted funnel, washing the solids with 2-propanol (154 g). The solids are dried (65° C./20 mm Hg (2.7 kPa)) to constant weight to give dry, brominated polymer (21.5 g, 86% of the calculated weight of 100% brominated material) that by proton NMR is estimated to contain 11% of unreacted double bonds. The 5% weight loss temperature for this product is 252° C.

EXAMPLE 13

To a 1-L round bottom flask equipped with a thermowell, overhead stirrer with a stir paddle, addition funnel, and nitrogen inlet are added a poly(styrene/butadiene) tri-block co-polymer containing 60% polybutadiene (9.0 g, equivalent to 0.1 mol polybutadiene), 1,2-dichlorobenzene (135 g), and 2-propanol (22.0 g). After the polymer has dissolved, the solution is cooled to 1° C. in an ice bath. Bromine (15.8 g, 0.099 mol) is added dropwise via an addition funnel over 18 minutes, keeping the pot temperature at or below 7° C. The funnel is rinsed with 1,2-dichlorobenzene (17 g), adding the rinse to the pot. After 7 minutes after the bromine addition is complete, the ice bath is removed and the hazy orange solution is transferred to an addition funnel, and diluted with chlorobenzene (130 g). A 3-L round bottom flask equipped with an overhead stirrer with a Teflon stir paddle, addition funnel, and nitrogen inlet is loaded with 2-propanol (753 g). The polymer solution is added via addition funnel to the 2-propanol. The slurry is filtered through a coarse glass-fritted funnel, washing the solids with 2-propanol (152 g). The solids are dried (60° C./30 mm Hg (4.0 kPa)) to constant weight to give dry, brominated polymer (22.0 g, 88% of the calculated weight of 100% brominated material) that by proton NMR is estimated to contain 13% of unreacted double bonds. The 5% weight loss temperature for this product, not including a trace of retained 1,2-dichlorobenzene, is estimated to be 252° C.

EXAMPLE 14

To a 1-L round bottom flask equipped with a thermowell, overhead stirrer with a stir paddle, addition funnel, and nitrogen inlet are added a poly(styrene/butadiene) tri-block co-polymer containing 60% polybutadiene (9.0 g, equivalent to 0.1 mol polybutadiene), dichloromethane (128 g), and 2-propanol (22.0 g). After the polymer has dissolved, the solution is cooled to 2° C. in an ice bath. Bromine (17.6 g, 0.11 mol) is added dropwise via an addition funnel over 11 minutes, keeping the pot temperature at or below 9° C. The funnel is rinsed with dichloromethane (6 g), adding the rinse to the pot. After 4 minutes after the bromine addition is complete, the ice bath is removed and the hazy orange solution is transferred to an addition funnel, and diluted with dichloromethane (148 g). A 3-L round bottom flask equipped with an overhead stirrer with a Teflon stir paddle, addition funnel, and nitrogen inlet is loaded with 2-propanol (755 g). The polymer solution is added via addition funnel to the 2-propanol. The slurry is filtered through a coarse glass-fritted funnel, washing the solids with 2-propanol (155 g). The solids are dried (60° C./20 mm Hg (2.7 kPa)) to constant weight to give dry, brominated polymer (22.3 g, 89% of the calculated weight of 100% brominated material) that by proton NMR is estimated to contain 6% of unreacted double bonds. The 5% weight loss temperature for this product is 245° C.

EXAMPLE 15

To a 1-L round bottom flask equipped with a thermowell, overhead stirrer with a stir paddle, addition funnel, and nitrogen inlet are added a poly(styrene/butadiene) tri-block co-polymer containing 60% polybutadiene (9.0 g, equivalent 0.1 mol polybutadiene), dichloromethane (100 g), and 2-propanol (21.9 g). After the polymer has dissolved, the solution is cooled to 1° C. in an ice bath. Bromine (19.2 g, 0.12 mol) is added dropwise via an addition funnel over 12 minutes, keeping the pot temperature at or below 11° C. The funnel is rinsed with dichloromethane (6 g), adding the rinse to the pot. After 6 minutes after the bromine addition is complete, the ice bath is removed and the hazy orange solution is transferred to an addition funnel, and diluted with dichloromethane (106 g).

A 3-L round bottom flask equipped with an overhead stirrer with a Teflon stir paddle, addition funnel, and nitrogen inlet is loaded with 2-propanol (754 g). The polymer solution is added via addition funnel to the 2-propanol. The slurry is filtered through a coarse glass-fritted funnel, washing the solids with 2-propanol (156 g). The solids are dried (60° C./20 mm Hg (2.7 kPa)) to constant weight to give dry, brominated polymer (22.5 g, 90% of the calculated weight of 100% brominated material) that by proton NMR is estimated to contain 4% of unreacted double bonds. The 5% weight loss temperature for this product is 245° C.

EXAMPLE 16

Two feeds are prepared. The first of these (Feed A) consists of a triblock polystyrene-polybutadiene rubber having a composition of 62% by weight polystyrene and 32% of a midblock of polybutadiene (30 g, equivalent to 0.21 mol polybutadiene), 230 mL of dichloromethane, and 48 mL of isopropanol. This mixture is stirred until the rubber dissolves completely. The second of these (Feed B) consists of bromine (10.8 mL, 0.21 moles) in 300 mL of dichloromethane. Feeds A and B are simultaneously fed to a chilled (5° C.) micro-reactor unit using a dual-feed syringe pump, and are each fed to the reactor at a flow rate of 2 mL/min, for a total liquid feed rate of 4 mL/min. The micro-reactor is constructed of glass and is of an interdigital triangular design by MGT Mikroglas Technik AG of Germany. This micro-reactor consists of five parallel reactor channels, each one having dimensions of 0.5 mm×0.5 mm×100 mm, for a reactor volume of 25 $mm^3$, or 0.025 mL per reactor channel. The reactant feed rate provides an average reactor residence time of 0.4 seconds. Some additional residence time is also attained in the effluent exit line from the reactor. The effluent from the reactor unit is fed directly to a stirring solution of 600 mL of isopropanol in a separate glass roundbottom flask, in order to precipitate the brominated polymer product and form a slurry. A total of 50 mL each of Feeds A and B are fed to the reactor over 25 minutes. The slurry in the roundbottom flask is filtered through a course glass funnel, and the recovered white solid is rinsed with methanol to remove residual isopropanol. The white solid is air dried, then vacuum oven dried at 60° C. for 20 hours to remove residual solvents. A total of 6.2 g of brominated polymeric product is thus obtained after drying. Proton NMR analysis in $CDCl_3$ shows that 73% of the double bonds have become brominated. TGA analysis shows a 5% weight loss temperature of 239° C. GPC analysis shows a weight average molecular weight value of 138,000 against a polystyrene standard, with a polydispersity value of 1.087.

EXAMPLE 17

To a 2-L round bottom flask equipped with a thermowell, overhead stirrer with a 3.25" Teflon stir paddle, addition funnel, and nitrogen inlet are added a poly(styrene/butadiene) tri-block co-polymer containing 60% by weight polymerized butadiene (90.0 g, 1 mol polybutadiene equivalent), 1,2-dichloroethane (891.4 g), and 2-propanol (218.5 g, 278 mL). After the polymer dissolves, the solution is cooled to 0° C. in an ice bath. Bromine (167.0 g, 54 mL, 1.04 mol) is added drop-wise via an addition funnel over 1 hour, keeping the pot temperature at or below 7° C. After the bromine addition is complete, the addition funnel is rinsed with dichloromethane (24 g), adding the rinse to the pot. The ice bath is removed and the slurry is transferred to a 3-L bottom drain round bottom flask equipped with a thermowell, overhead stirrer with a 3.25" stir paddle, and nitrogen inlet. The slurry is diluted with dichloromethane (499 g) and water (758.6 g). The two-phase mixture is stirred and 10% aqueous sodium bisulfite (52 g) is added, producing a white mixture Stirring is stopped and after removing both layers, the organic layer is reloaded and 29.8 g (0.15 mol) of 25% sodium methoxide in methanol is added. The mixture is then washed with 900 g of deionized water. The organic layer is recovered and added to 88 g of 1,2-dichloroethane, and the resulting solution is washed with 923.5 g of deionized water. The organic layer is filtered through a 25 g bed of diatomaceous earth, washing the solids with 129 g of 1,2-dichloroethane. The brominated polymer is precipitated from the resulting filtrate in two portions using a 5-L round bottom flask equipped with overhead stirring, an addition funnel, and a nitrogen inlet. To the vessel is added 2-propanol (1978 g for the first precipitation, 1586 g for the second precipitation step). The polymer solution (940 g for the first precipitation step, 763 g for the second precipitation step) is added via the addition funnel. The resulting slurries are separately filtered on a 2-L coarse glass-fritted funnel, washing the combined wet cake with 400 g of 2-propanol. The wet cake is transferred to a drying tray and is dried under ambient conditions for over 2 days in a fume hood, yielding 207.6 g (83% of theoretical assuming 100% bromination of double bonds) of brominated polymer powder. The percent bromination of the aliphatic carbon-carbon double bonds is estimated by proton NMR to be 92%. The 5% WLT value is 240° C.

EXAMPLES 18-22

A brominated copolymer is prepared in a method similar to that described in Example 8. The brominated copolymer is dissolved in 1,2-dichloroethane to form a 15% by weight solution.

16.71 g of the brominated copolymer solution is mixed with 0.24 grams of a 25% solution of sodium methoxide in methanol. The solution is allowed to stand at room temperature overnight and is then divided into 2 equal portions. 40 mL of 2-propanol and 4 mL of water are charged to a 60 mL jar, along with one portion (about 7 mL) of the brominated copolymer solution/sodium methoxide mixture. Each jar is shaken vigorously to disperse the solids. The resulting slurry is filtered and the solids are washed with 2-propanol. The solids are then air-dried and ground. The resulting treated copolymer is designated Sample 18A.

The second portion of the brominated copolymer solution/sodium methoxide mixture is allowed to stand for 1 week at room temperature, and then is mixed with 10 mL of 1,2-dichloroethane. The resulting mixture is put into a jar which is placed into a 46° C. water bath. The water bath is then heated to 60° C. over the course of about an hour. The water bath is then permitted to cool to 27° C., after which time the sample is removed, cooled to room temperature and left overnight. 70 mL of 2-propanol and 10 mL of deionized water are added to jar. The jar is shaken vigorously to disperse the solids, and the solids are washed, dried and ground as in Sample 18A. The resulting treated copolymer is designated Sample 18B.

Samples 19A, 20A, 21A and 22A are made in the same manner as Sample 18A, using different alkali metal bases as indicated in Table 1 below. Samples 19B, 20B, 21B and 22B are made in the same manner as Sample 18B, using different alkali metal bases as indicated in Table 1 below.

The 5% WLT is measured for each of Samples 18A, 19A, 20A, 21A, 22A, 18B, 19B, 20B, 21B and 22B. Results are as indicated in Table 1 below. In Table 1, Comparative Sample B is the untreated brominated copolymer, which is precipitated from the 15% starting solution. Comparative Sample C is the untreated brominated copolymer, which is precipitated from solution after (1) allowing the starting solution to stand at room temperature for one week, (2) adding 10 mL of 1,2-dichloroethane and (3) heating and cooling the solution as described for Sample 18B. Results are as indicated in Table 1.

TABLE 1

| Example or Comparative Sample No. | Alkali Metal Base | g Base | g Starting Copolymer | 5% WLT |
|---|---|---|---|---|
| B* | None | None | 16.73 | 221.6 |
| 18A | Sodium methoxide[1] | 0.24 | 16.71 | 230.7 |
| 19A | Sodium ethoxide[2] | 0.32 | 16.73 | 230.1 |
| 20A | Lithium ethoxide[3] | 0.91 | 16.87 | 232.7 |
| 21A | Sodium hydroxide[4] | 0.20 | 16.82 | 225.3 |
| 22A | Sodium carbonate[5] | 0.11 | 17.52 | 226.8 |
| C* | None | None | 16.73 | 235.4 |
| 18B | Sodium methoxide[1] | 0.24 | 16.71 | 240.8 |
| 19B | Sodium ethoxide[2] | 0.32 | 16.73 | 242.9 |
| 20B | Lithium ethoxide[3] | 0.91 | 16.87 | 238.1 |
| 21B | Sodium hydroxide[4] | 0.20 | 16.82 | 234.9 |
| 22B | Sodium carbonate[5] | 0.11 | 17.52 | 238.6 |

*Not an example of the invention.
[1] 25% by weight solution in methanol.
[2] 21% by weight solution in methanol.
[3] 1M solution in water.
[4] 20% by weight solution in water.
[5] 1.53 g of water also added.

Examples 18A-22A show an increase in the 5% WLT of from 3.7 to 11.1° C. on these tests, compared to Comparative Sample B. The alkoxide bases provide significantly more increase in 5% WLT than do either sodium hydroxide or sodium carbonate.

Samples 18B-22B all show increases in 5% WLT, except for Sample 21B, which shows a small (0.5° C.) decrease, compared to Comparative Sample C. Again, treatment with the alkoxide bases in general provides a greater benefit, of up to 7.5° C. increase in WLT.

EXAMPLE 23

To a 1-L round bottom flask equipped with a thermowell, overhead stirrer with a stir paddle, addition funnel, and nitrogen inlet are added a poly(styrene/butadiene) tri-block copolymer containing 60% polybutadiene (9.0 g, equivalent 0.1 mol polybutadiene), cyclohexane (202 g), and 2-propanol (6.2 g). After the polymer has dissolved, the solution is heated to 70° C. using a heating mantle. Bromine (16.8 g, 0.105 mol) in cyclohexane (33.3 g) is added dropwise via an addition funnel over 26 minutes, keeping the pot temperature between 65-70° C. The funnel is rinsed with cyclohexane (33.6 g), adding the rinse to the pot. After the bromine addition is complete, the heating mantle is removed. When the pot temperature has dropped below 56° C., 2-propanol (390 g) is added via addition funnel to the polymer mixture. The slurry is cooled to below 30° C. and is filtered through a coarse glass-fritted funnel, washing the solids with 2-propanol (193 g). The solids are dried overnight under ambient conditions.

To a 1-L round bottom flask equipped with a thermowell, overhead stirrer with a stir paddle, addition funnel, and nitrogen inlet are added the dried solids and 1,2-dichloroethane (359 g). To a 5-L round bottom flask equipped with a thermowell, overhead stirrer with a stir paddle, addition funnel, and nitrogen inlet is added 2-propanol (814 g). The hazy polymer solution is transferred to the additional funnel and is added the 5-L vessel. The slurry is filtered through a coarse glass-fritted funnel, washing the solids with 2-propanol (265 g). The solids are dried under ambient conditions to constant weight to give dry, brominated polymer (19.3 g, 76% of the calculated weight of 100% brominated material) that by proton NMR is estimated to contain 4% of unreacted double bonds. The 5% weight loss temperature for this product is 251° C.

What is claimed is:

1. A process of preparing a brominated butadiene copolymer, the process comprising
    (a) contacting a solution of a starting copolymer of butadiene and at least one vinyl aromatic monomer in a non-oxygenated solvent with $Br_2$ in an amount of from 0.5 to 1.5 equivalents per equivalent of aliphatic carbon-carbon double bonds in the starting copolymer to form a reaction solution, said contact being in the presence of from 0.75 to 3.5 moles of an aliphatic alcohol per mole of $Br_2$; and
    (b) maintaining the reaction solution under reaction conditions for a period of time sufficient to brominate more than 25 percent of aliphatic double bonds contained in the starting copolymer.

2. The process of claim 1, wherein the aliphatic alcohol has a secondary or tertiary hydroxyl group.

3. The process of claim 1 wherein the aliphatic alcohol has from 1 to 8 carbon atoms.

4. The process of claim 3, wherein the aliphatic alcohol is 2-propanol, 2-butanol, t-butanol or 2-pentanol.

5. The process of claim 4, wherein in step a), from 0.8 to 1.2 equivalents of bromine are contacted with the solution of starting copolymer per equivalent of aliphatic carbon-carbon double bonds in the starting copolymer.

6. The process of claim 1, wherein the starting polymer contains 1,2-butadiene units, and the 1,2-butadiene units constitute at least 50% of the butadiene units in the starting polymer.

7. The process of claim 6, wherein the starting polymer has a weight average molecular weight, by GPC relative to a polystyrene standard, of from 50,000 to 175,000.

8. The process of claim 1, wherein steps a) and b) are conducted at a temperature of from −20 to 85° C.

9. The process of claim 8 wherein the starting polymer is a block copolymer of styrene and butadiene.

10. The process of claim 1 which is operated continuously.

11. The process of claim 1, further comprising contacting the brominated copolymer with an alkali metal alkoxide.

12. The process of claim 10, further comprising contacting the brominated copolymer with an alkali metal alkoxide, wherein from 0.05 to 0.20 mole of the alkali metal alkoxide is contacted with the brominated copolymer per mole of repeating brominated or unbrominated butadiene units in the copolymer.

* * * * *